United States Patent
Kar et al.

(10) Patent No.: US 7,397,761 B2
(45) Date of Patent: Jul. 8, 2008

(54) ROUTING RESTORABLE SERVICE-LEVEL-GUARANTEED CONNECTIONS USING MAXIMUM 2-ROUTE FLOWS

(75) Inventors: Koushik Kar, Troy, NY (US); Muralidharan S. Kodialam, Marlboro, NJ (US); Tirunell V. Lakshman, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1054 days.

(21) Appl. No.: 10/357,558

(22) Filed: Feb. 4, 2003

(65) Prior Publication Data
US 2003/0227877 A1 Dec. 11, 2003

Related U.S. Application Data

(60) Provisional application No. 60/387,532, filed on Jun. 10, 2002.

(51) Int. Cl.
*G01R 31/08* (2006.01)
*H04J 1/16* (2006.01)
*H04L 1/00* (2006.01)

(52) U.S. Cl. .................. 370/225; 370/351; 370/352; 370/238; 370/252; 370/216; 370/217; 370/226; 370/227

(58) Field of Classification Search ................ None
See application file for complete search history.

(56) References Cited

U.S. PATENT DOCUMENTS

| | | | | |
|---|---|---|---|---|
| 5,930,348 | A | * | 7/1999 | Regnier et al. ......... 379/221.01 |
| 6,091,720 | A | * | 7/2000 | Bedard et al. ............... 370/351 |
| 6,778,531 | B1 | * | 8/2004 | Kodialam et al. ........... 370/390 |

OTHER PUBLICATIONS

"Faster and Simpler Algorithms for Multicommodity Flow and other Fractional Packing Problems" by Naveen Garg and Jochen Könemann, , pp. 1-10.
"A Simple Efficient Approximation Scheme for the Restricted Shortest Path Problem" by Dean H. Lorenz and Danny Raz, , pp. 1-10.

* cited by examiner

*Primary Examiner*—Raj K Jain

(57) ABSTRACT

A packet network employs restorable routing with service level guarantees. Restorable routing generates two disjoint paths through a network of nodes interconnected by links for a connection request demand between and ingress-egress node pair. Restorable routing employs minimum interference criteria to generate the two disjoint paths such that two disjoint paths cause little or no interference with demands of future connection requests between different ingress-egress pairs. Restorable routing generates maximum 2-route flows for the network ingress-egress node pairs to determine corresponding sets of 2-critical links. A reduced network is formed, its links are weighted based on criticality indices generated from the sets of 2-critical links, and the relatively optimal two disjoint paths are computed for the connection request. One of the two disjoint paths is selected as an active path for routing data of the connection request, and the other disjoint path is selected as the backup path.

14 Claims, 7 Drawing Sheets

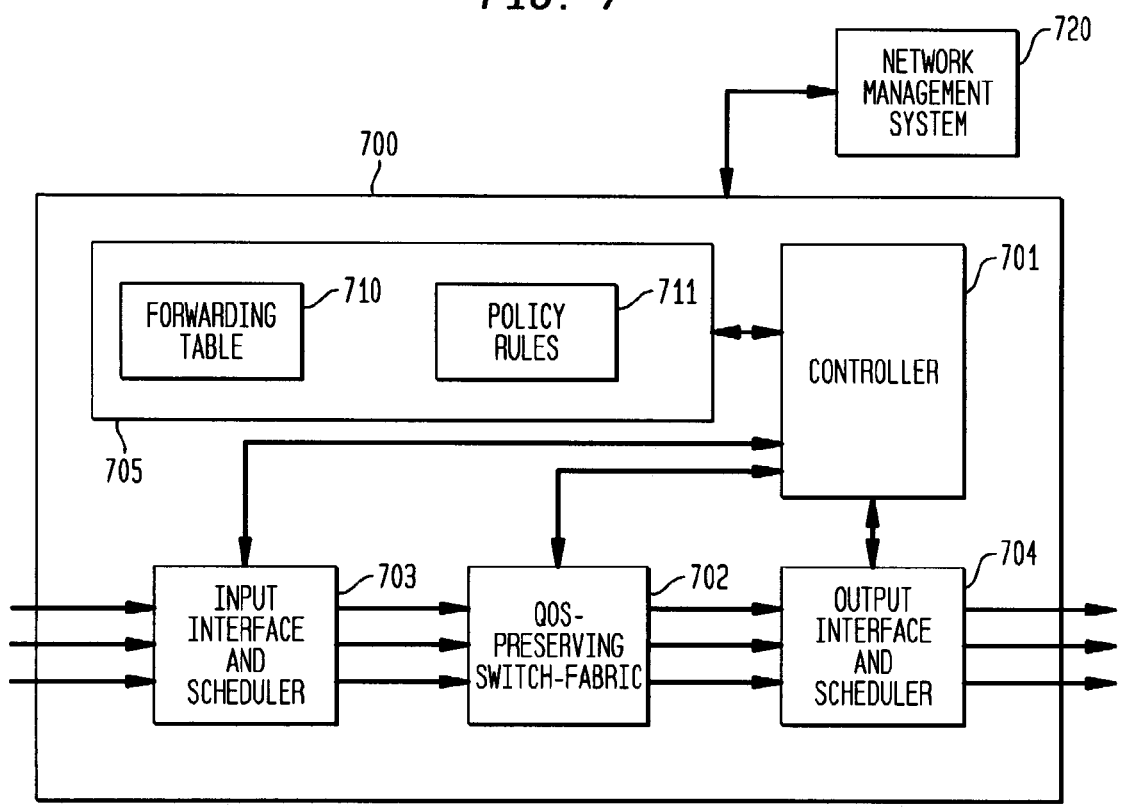

US 7,397,761 B2

ROUTING RESTORABLE SERVICE-LEVEL-GUARANTEED CONNECTIONS USING MAXIMUM 2-ROUTE FLOWS

CROSS-REFERENCE TO RELATED APPLICATIONS

This application claims the benefit of the filing date of U.S. provisional application no. 60/387,532, filed on Jun. 10, 2002.

BACKGROUND OF THE INVENTION

1. Field of the Invention

The present invention relates to packet routing in telecommunication systems, and, more particularly, to determining paths through nodes of a packet network for routing of packets with guaranteed service levels for restorable connections.

2. Description of the Related Art

In interconnected communications networks, such as the Internet, users establish connections between a source and a destination with a stream of data packets, called packet flows, that are transferred through the network over a network path. Packet networks are typically characterized by a set of routers connected via links, and optical networks, while not necessarily packet-based, are similarly configured with optical switches interconnected by optical links. A network path is defined by a set of nodes (routers or optical switches) interconnected by a set of links. Packet and optical networks may have a hierarchical structure in which smaller networks are interconnected by larger networks, and a peer structure in which equivalent networks are interconnected. A network connects to one or more other external networks through ingress nodes (those nodes receiving data from external networks) and egress nodes (those nodes transferring data to external networks). Nodes may be, for example, routers in a packet network or optical terminals in an optical network.

Interior routing protocols are employed by routers to determine forwarding of packets between a source and destination pair along a path through the nodes of the interconnected packet network. Packets received by a node's router are forwarded to other nodes based on a forwarding table constructed in accordance with the interior routing protocol or routes installed with explicit route provisioning. Interior routing protocols may also specify exchange network topology and link-state information ("network topology information") among routers to allow the node's router to construct the corresponding forwarding table. An example of a widely used interior routing protocol for "best effort" routing is the Open Shortest Path First (OSPF) protocol. In addition, some routing protocols associate a link "cost" with each link between nodes. This link cost may be associated with, for example, average link utilization or revenue generated by the link, as well as link importance in the network. When link-state information or link-bandwidth (e.g., connectivity or available bandwidth) is exchanged between routers, each router in the network has a complete description of the network's topology.

Since routing of packets at the higher levels is desirably performed at high speed, each higher-level packet network may use its own interior routing protocol in addition to the interior routing protocol of the lower-level packet network. Routing protocols, in addition to providing connectivity, may also enable traffic management. The Multi-Protocol Label Switched (MPLS) standard, for example, allows such routing protocols in backbone networks. The MPLS standard may be employed for networks having virtual circuits (packet flows) with provisioned service levels (also known as guaranteed quality-of-service (QoS)).

Provisioned service levels may be, for example, a guaranteed minimum bandwidth for the path of a packet flow through the backbone network. This path having a guaranteed level of service between ingress and egress points may be referred to as a Network Tunnel Path (NTP). As would be apparent to one skilled in the art, specific implementations of NTPs exist for different types of networks. As examples of NTPs, virtual circuits may be established for packet flows in TCP/IP networks, virtual circuits may be established for cells in Asynchronous Transfer Mode (ATM) networks, and label switched paths (LSPs) may be established for packets in MPLS networks. Packets of a signaling protocol, such as RSVP (Reservation Protocol for IP and MPLS networks) or LDP (Label Distribution Protocol) for MPLS networks, may be used to reserve link bandwidth and establish an NTP, once routing for the NTP, is calculated. NTPs may be provisioned as an explicit route along specific paths between nodes of the backbone network (i.e., when an NTP is provisioned, all intermediate points may be specified through which a packet passes between the ingress and egress points of the NTP).

To generate a forwarding table, each router computes a set of preferred paths through the network nodes, and may use the weights to calculate the set of preferred paths. Each preferred path has a minimum total weight between nodes as well as minimum summed weight through nodes of the path, which is known in the art as shortest-path routing. This set of preferred paths may be defined with a shortest-path tree (SPT). The forwarding table with routing information (e.g., source-destination pair, source ports, and destination ports) is generated from the SPT. The router uses the routing information to forward a received packet to its destination along the shortest path of the SPT. The SPT may be calculated using an algorithm such as Dijkstra's algorithm, described in E. Dijkstra, "A Note: Two Problems In Connection With Graphs," Numerical Mathematics, vol.1, 1959, pp. 269-271.

Restoring service after link failure(s) is an important aspect of both packet and optical networks. For restoration, each connection is routed along two disjoint paths through the network: a primary (active path) and a secondary (backup) path. The backup path is used for restoring connectivity if the active path fails. For some networks, capacity in links of the backup path may be shared between different connections for bandwidth efficiency. For sharing to be possible, the nodes performing route computations must know the amount of bandwidth on each link that is currently used for providing backup capacity. While this information might be disseminated according to link-state routing protocols, the information might only include link status and the bandwidth used for carrying active paths. Sharing might not be possible when the sender simultaneously transmits on both paths and the receiver chooses to receive data from the path with the strong signal, such as in optical networks. Simultaneous transmission is often employed in optical networks despite its bandwidth inefficiency because it allows relatively quick and simple restoration (only the receiver needs to detect and act upon failure).

SUMMARY OF THE INVENTION

In accordance with embodiments of the present invention, restorable routing with service-level guarantees generates two disjoint paths through a network of nodes interconnected by links for a connection request of having a demand between an ingress-egress node pair. Restorable routing employs minimum interference criteria to generate the two disjoint paths such that two disjoint paths cause little or no interference with demands of future connection requests between different ingress-egress pairs. Restorable routing generates maximum 2-route flows for the network ingress-egress node pairs to determine corresponding sets of 2-critical links. A reduced network is formed, its links are weighted based on criticality indices generated from the sets of 2-critical links, and the relatively optimal two disjoint paths are computed for the connection request. One of the two disjoint paths is selected as an active path for routing data of the connection request, and the other disjoint path is selected as the backup path for the active path.

For some exemplary embodiments, data of a connection request is routed through a network of nodes interconnected by links and having one or more ingress-egress node pairs. A maximum 2-route flows is generated for each of the ingress-egress node pairs in the network; and a set of 2-critical links with associated criticality indices is generated for each of the ingress-egress node pairs based on the corresponding maximum 2-route flow. A graph of the network is modified by eliminating any links in the graph having residual capacity less than a demand of the connection request, and weighting each link in the modified graph according based on the criticality indices of the links. A disjoint path pair through the modified graph is determined between an ingress node and an egress node of the connection request.

BRIEF DESCRIPTION OF THE DRAWINGS

Other aspects, features, and advantages of the present invention will become more fully apparent from the following detailed description, the appended claims, and the accompanying drawings in which:

FIG. 7 shows an exemplary processing section of a router implementing one or more exemplary embodiments of restorable routing of the present invention.

DETAILED DESCRIPTION

Figure 1:
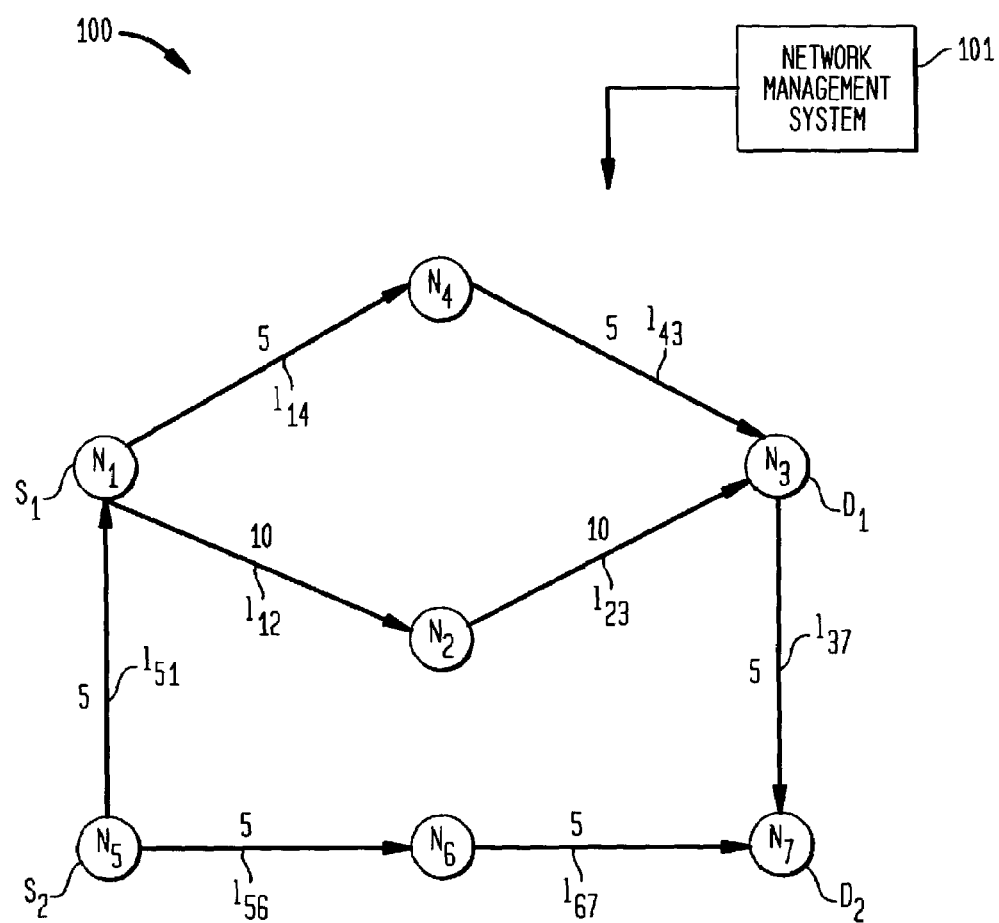
FIG. 1 shows a network having nodes interconnected through links.

The following definitions may aide in the understanding of the present invention. FIG. 1 shows an exemplary network 100 of nodes N1-N7 interconnected by unidirectional links $l_{ij}$, i and j integers and $1 \leq i,j \leq 7$. Nodes N1 and N5 are ingress nodes $S_1$ and $S_2$, respectively. Nodes N3 and N7 are egress nodes $D_1$ and $D_2$, respectively. Nodes N1 and N3 form one ingress-egress pair $S_1$ and $D_1$, and nodes N3 and N7 form a second ingress-egress pair $S_2$ and $D_2$. Also shown in FIG. 1 is network management system 101, which may exchange network node, link, capacity, provisioning, and connection information with nodes N1-N7. Network management system 101, or one or more of nodes N1-N7, may implement restorable routing in accordance with an exemplary embodiment of the present invention.

Nodes N1-N7 of network 100 may be routers or packet switches of a packet network, or they may be optical switches of an optical network. The links $l_{ij}$ interconnecting nodes N1-N7 may be of any form of transmission medium, such as wire, optical fiber, or wireless/radio.

A connection request seeks to establish a connection between a given ingress node and egress node with a demand, which demand is typically a bandwidth for the connection. One skilled in the art may extend the definition of demand to different service-level guarantees, such as minimum delay and packet loss, by converting the demand to an effective bandwidth. Consequently, the following describes embodiments of the present invention with respect to bandwidth as the demand, although the present invention may be extended to other types of service-level guarantee.

A demand of a restorable connection is routed over a pair of link-disjoint paths (one link disjoint path for the active path and the other for the backup path). A pair of link disjoint paths are two paths that do not have any links in common. An "elementary 2-flow" is defined as a flow of one (demand) unit along a pair of link-disjoint paths (where a "flow" is a stream of data or packets of the connection routed over one or more paths between the ingress-egress node pair). In FIG. 1, for example, a flow of one unit on each of the paths defined through nodes N1-N4-N3 and nodes N1-N2-N3 together constitute an elementary 2-flow for the ingress-egress node pair $(S_1, D_1)$.

A "2-route flow" is defined as any flow that might be expressed as a non-negative linear sum of elementary 2-flows. Therefore, a flow of 5 units on both paths defined through nodes N1-N4-N3 and nodes N1-N2-N3 constitutes a 2-route flow for $(S_1, D_1)$. Similarly, a flow of 2 units on both paths defined through nodes N5-N1-N4-N3-N7 and N5-N1-N2-N3-N7 together with a flow of 4 units on the path defined through nodes N5-N6-N7 constitute a 2-route flow (this flow may be decomposed into two elementary 2-flows along the link-disjoint path pair N5-N1-N4-N3-N7 and N5-N6-N7). The sum of several 2-route flows is also a 2-route flow, and since every demand with backup routed in a network is a 2-route flow, the bandwidth routed (including both active and backup paths) between any ingress-egress node pair constitutes a 2-route flow.

The "value" of a 2-route flow is the total amount of flow including flow over both active and backup paths that enters the destination node for that flow. Therefore, for a 2-route flow that represents the bandwidth routed between an ingress-egress node pair, the value is twice the total amount of bandwidth routed on the active paths (or the backup paths). The term 2-route flow may refer to the value of the flow as well as to the flow itself. The "maximum 2-route flow" between two nodes is a 2-route flow with the maximum value that may be routed over the path between the two nodes, without exceeding the capacities of links of the path. The maximum 2-route flow for $(S_1, D_1)$ is 10 units (5 units on both of the paths N1-N4-N3 and N1-N2-N3). Similarly, the maximum 2-route flow for $(S_2, D_2)$ is also 10 units.

The maximum 2-route flow for an ingress-egress node pair is an upper bound on the total amount of restorable bandwidth that can be routed between that ingress-egress node pair. Therefore, the maximum 2-route flow for an ingress-egress node pair might be considered as a measure of the "open capacity" between that pair. When a demand is routed, the maximum 2-route flow for one or more ingress-egress node pairs may decrease. In minimum interference routing, demands are routed such that this reduction in the maximum 2-route flow for the different ingress-egress node pairs is as small as possible.

Each ingress-egress node pair (s,d) has an associated maxflow value that corresponds to an upper bound for the total bandwidth (or other service level) in paths that may be routed between the ingress-egress node pair after accounting for the demands of currently provisioned connections. The maxflow value changes as bandwidth across links in the network is assigned and released when provisioning and deleting connections. In addition, each ingress-egress node pair may have an associated scalar weight that may correspond to a relative usage, importance, or cost of the particular ingress-egress node pair. The maxflow value may decrease (increase) when bandwidth is allocated (released) for connections between the ingress-egress node pair (s, d). The maxflow value may also decrease (increase) when bandwidth is allocated (released) for connections between other ingress-egress node pairs in the network whose paths share common links between nodes with a path of the node pair (s, d). Such computation of maxflow values may be by any of various algorithms known in the art. For example, discussion of maxflow calculation is given in Ahuja, Magnanti, and Orlin, *Network Flows: Theory, Algorithms, and Applications*, Prentice-Hall, 1993, Chapter 7.

The difference between maxflow and maximum 2-route flow may be shown by the following example for the ingress-egress node pair $(S_2, D_2)$ in network 100 of FIG. 1. For network 100, ther is no other traffic routed through the network. The maxflow for $(S_2, D_2)$ is 10 units, which is the same as the maximum 2-route flow for $(S_2, D_2)$ since both active and backup paths are bounded by the 5 unit capacity of link $l_{51}$. The maxflow for $(S_1, D_1)$ is 15 units (5 units on path N1-N4-N3, and 10 units on path N1-N2-N3), whereas the maximum 2-route flow for $(S_1, D_1)$ is only 10 units (5 units on path N1-N4-N3, and 5 units on path N1-N2-N3). Thus, the maximum 2-route flow is upper-bounded by the maxflow value for the ingress-egress node pair. For non-restorable demands, the maxflow value for an ingress-egress node pair is a measure "open capacity" between that particular ingress-egress node pair. 15 units of non-restorable flow might be routed between $S_1$ and $D_1$, but only 5 units of restorable demands may be routed according to the maximum 2-route flow for $(S_1, D_1)$. Therefore the total amount of bandwidth allocated to the active and backup paths is only 10 units.

A link is defined to be a "critical link" for an ingress-egress node pair if the maxflow value for the ingress-egress node pair decreases whenever the capacity of the link is decreased. Similarly, a link is defined to be a "2-critical link" for an ingress-egress node pair if the value of maximum 2-route flow for the ingress-egress node pair decreases whenever the capacity of the link is decreased. If the current request for a new restorable connection (active or backup path) is along a 2-critical link, then the maximum 2-route flow between a particular ingress-egress node pair is reduced when the connection is established. A link might be 2-critical for several different ingress-egress node pairs. To keep the maximum 2-route flows between all ingress-egress node pairs as high as possible, embodiments of the present invention try to avoid routing connections (active as well as backup paths) over these 2-critical links.

For the ingress-egress node pair $(S_1, D_1)$ in FIG. 1, all links $l_{1,4}, l_{4,3}, l_{1,2}$, and $l_{2,3}$ are critical links for this pair, since the maxflow for this pair decreases if a connection is routed on any of these links. However, only links $l_{1,4}$ and $l_{4,3}$ are 2-critical links for $(S_1, D_1)$. For the ingress-egress node pair $(S_2, D_2)$, a demand of 1 unit between $S_2$ and $D_2$ requires an active as well as a backup path. Either the active or the backup path has to be routed over the path defined through nodes N5-N6-N7, whereas the other one may be routed either over the path defined by nodes N5-N1-N4-N3-N7 or over the path defined by nodes N5-N1-N2-N3-N7 (or both these paths if the flow is split). If the path N5-N1-N4-N3-N7 is employed for $(S_2, D_2)$, then the total amount of demand that might be routed between $S_1$ and $D_1$ drops down by 1 unit. However, if the path N1-N2-N3 is employed, the total amount of demand that might be routed between $S_1$ and $D_1$ remains the same. Therefore, the path N1-N2-N3 is preferred over the path N1-N4-N3. If we route based on 2-critical links for $(S_1, D_1)$, the path N1-N2-N3 is selected (only the links $l_{1,4}$ and $l_{4,3}$ are 2-critical for $(S_1, D_1)$) to route the demand so as to avoid the 2-critical links. The criticality index of a link l (denoted by w(l)), is defined as a measure of the link's criticality in routing future demands over the network. For example, the criticality index might be set as the number of source-destination pairs for which the link is a 2-critical link.

The graph G=(N,L,B) describes a given network, such as network 100 shown in FIG. 1, where N is the set of routers (nodes), L is the set of links (or "edges"), and associated with set L is a set B of corresponding link available bandwidths. The term "edge" is typically employed in graph theory, while "link is commonly employed in telecommunications; both terms are equivalent for the description of the present invention herein and refer to the medium connecting two nodes. For convenience, G=(N,L,B) is also written as G=(N,L) herein. The variable n denotes the number of nodes, and m denotes the number of links in the network. A set of distinguished ingress-egress node pairs is denoted as P, and all connection requests (with associated demands) occur between these pairs in the set P. A generic element of this set P is (s, d), and p denotes the cardinality of the set P. For each (s, d)∈P(where "∈" is "an element of"), $T_{sd}$ denotes the set of all link-disjoint path pairs between source s and destination d. Therefore, $T_{sd}$ is the set of path pairs over which a demand between (s, d) might be routed. Requests with associated demands arrive one at a time, and the current request's demand is of D units from source node a to destination node b, where (a, b)∈P.

In accordance with embodiments of the present invention, restorable routing determines a pair of link-disjoint paths between nodes a and b to route this bandwidth request of D units. One of paths of the optimal path pair may be used for the active path, and the other for the backup path. The demand is routed over one of a link-disjoint path pair such that the sum of the critically indices of the links in the link-disjoint path pair is minimized to not significantly decrease the maximum 2-route flows for the different ingress-egress node pairs. Therefore, the optimal path pair j* for a demand to be routed between (s, d) is obtained as given in equation (1):

$$j^* = \arg \min_{j \in T_{s,d}} \sum_{l \in j} w(l). \quad (1)$$

Since residual capacities change as demands are routed or terminated, the set of the 2-critical links for any ingress-egress node pair changes.

Figure 2:
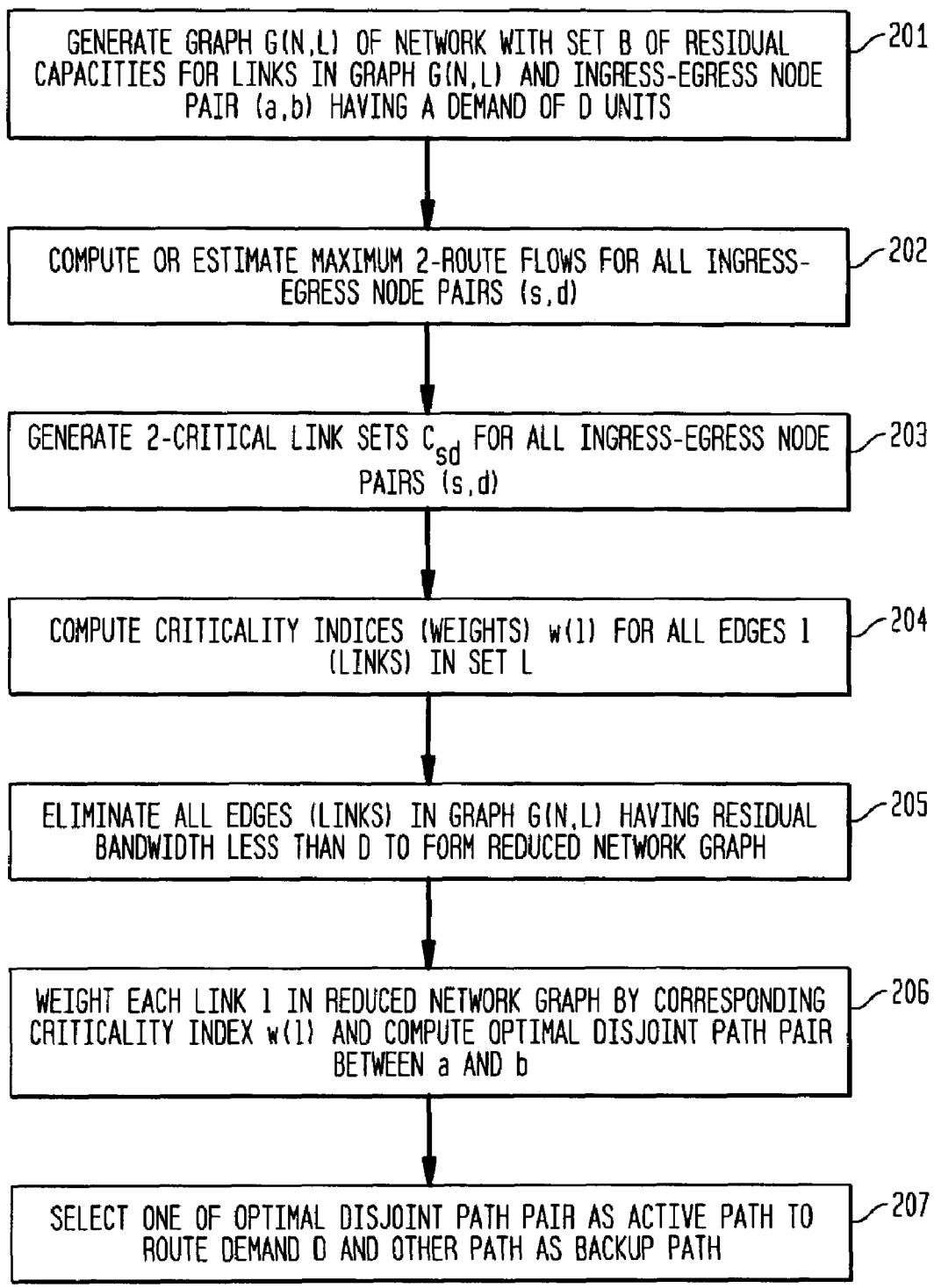
FIG. 2 shows an exemplary method of restorable routing in accordance with exemplary embodiments of the present invention.

FIG. 2 shows an exemplary method of restorable routing in accordance with exemplary embodiments of the present invention. At step 201 a graph G(N,L) is generated for the network and a connection request is received with demand of D units between the node pair (a,b). At step 202 maximum 2-route flows for all ingress-egress node pairs (s,d) in the network are either computed or estimated, depending on the method employed (described subsequently with respect to FIGS. 3 and 5).

At step 203 the 2-critical link sets $C_{sd}$ for all ingress-egress node pairs (s,d) in the network are generated. At step 204 criticality indices w(l) for all links l in the set L are computed. For the described embodiments, computing 2-critical links and generating criticality indices of steps 203 and 204 may occur concurrently.

At step 205 a reduced network graph is generated by eliminating all links in the graph G(N,L) having residual bandwidth less than D units. Residual bandwidth for a link is the capacity of the link minus the demands of connection already routed over the link. At step 206, each link l in the reduced network graph is weighted by the corresponding criticality index w(l), and the optimal disjoint path pair between a and b is computed for the reduced network graph. The optimal disjoint path pair may be computed using, for example, a solution for the relation of equation (1), and is described subsequently with respect to FIG. 4. At step 207, one path of the disjoint path pair is selected for routing the demand D of the connection request, while the other path is reserved as a backup path for the connection.

In accordance with a first exemplary embodiment of the present invention, restoration routing is based on maxflow computation. The maximum K-route flow between two nodes in a network may be computed by solving at most (K+1) maxflow problems. For any network G=(N, L, B), the modified graph G(N, L, B$^u$) (also termed G$^u$) denotes a network with the same set of nodes and links as G, but where all link capacities greater than the capacity bound u are set to u. Therefore, for any link l∈L, $b_l^u$=min{u,$b_l$}, where $b_l$ and $b_l^u$ are the capacities of link l in G and G$^u$, respectively. Network G$^u$ is therefore a capacity-bounded version of network G(N, L). If the capacity u is selected appropriately, then a maxflow computed in the capacity-bounded network G$^u$ is a maximum 2-route flow in the original network G. Moreover, if the value of the maximum 2-route flow in G is v*, then the maxflow in the network G$^{u*}$ with u*=(v*/2) is a maximum 2-route flow in G. Thus, an algorithm computing the maximum 2-route flow tries to find the appropriate capacity bound, u*. Initially, the capacity bound is set to half of the maxflow value in G. If the maxflow value in the resulting capacity-bounded network is the same as the maxflow value in the original network, then the capacity bound is the correct one. Otherwise, the capacity bound is revised based on the maxflow values already computed so that it corresponds to the correct capacity bound.

Figure 3:
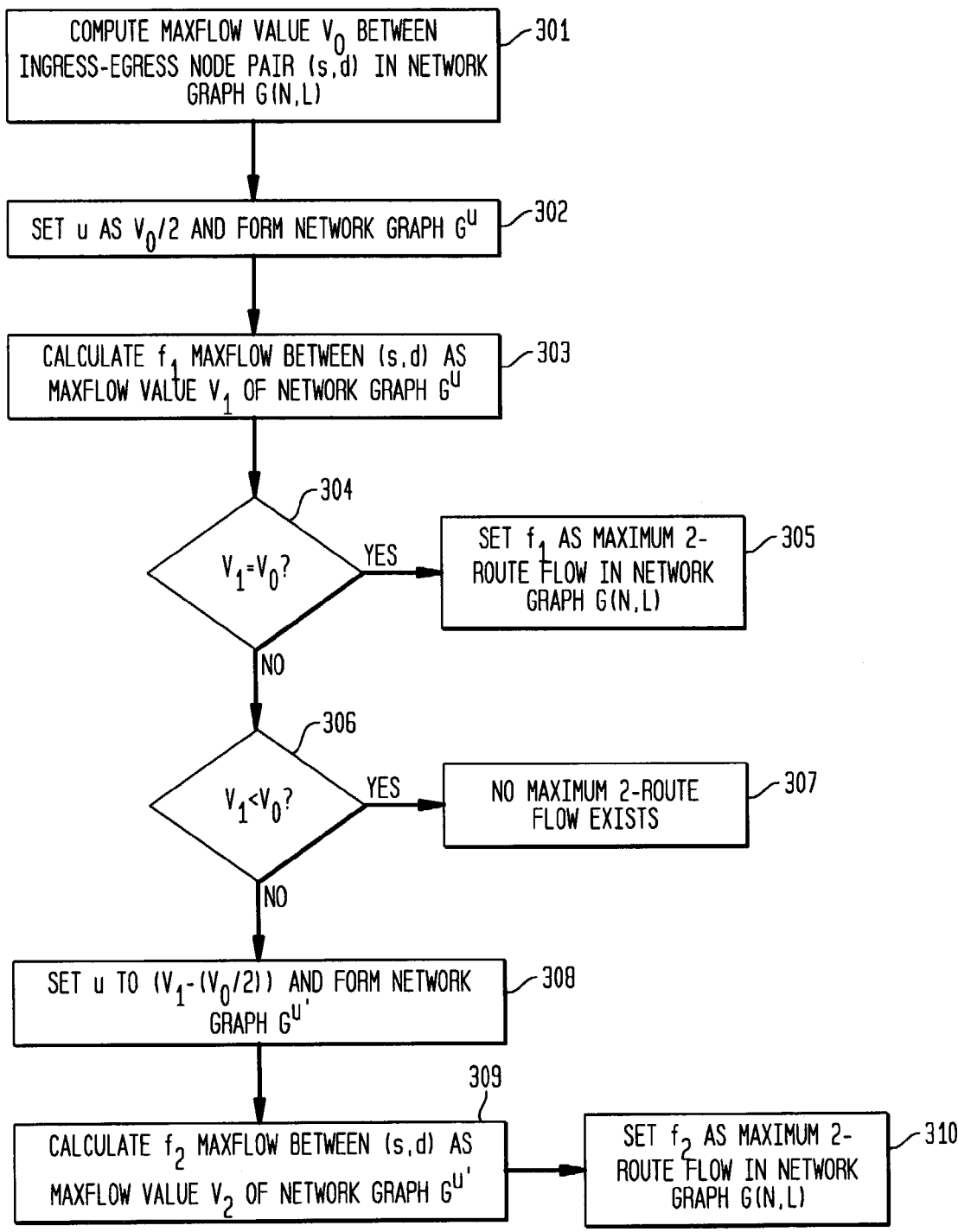
FIG. 3 shows an exemplary method of generating maximum 2-route flow for an ingress-egress node pair employed by the method of FIG. 2.

FIG. 3 shows an exemplary method of generating maximum 2-route flow for an ingress-egress node pair (s,d) employed by step 202 of FIG. 2. At step 301, the maxflow value $v_0$ between the ingress-egress node pair (s,d) in network graph G(N,L) is computed. At step 302, u is set as $v_0$/2 and a reduced network graph G$^u$ is formed. At step 303, the maxflow value $v_1$ for maxflow $f_1$ in graph G$^u$ is calculated.

At step 304, a test determines whether $v_1$=$v_0$. If the test of step 304 determines that $v_1$=$v_0$, then, at step 305, $f_1$ is set as the maximum 2-route flow in network graph G(N,L). If the test of step 304 determines that $v_1$ is not equal to $v_0$, then, at step 306, a test determines whether $v_1$ is less than $v_0$. If $v_1$ is less than $v_0$ then no maximum 2-route flow exists. If the test of step 306 determines that $v_1$ is not less than $v_0$, then the method advances to step 308. At step 308, u is set to ($v_1$−($v_0$/2)), and a new network graph G$^{u'}$ is formed. At step 309, the maxflow value $v_2$ for maxflow $f_2$ in the new graph G$^{u'}$ is calculated. At step 310, $f_2$ is set as the maximum 2-route flow in network graph G(N,L).

The solution of the maximum 2-route flow may be employed for step 203 of FIG. 2 to compute the set of 2-critical links for a given ingress-egress node pair. The conditions that a link needs to satisfy for it to be 2-critical are as follows. The variable f* denotes a maximum 2-route flow between (s,d) in a network G and its value is denoted v*. The variable u* is set to (v*/2), and f* is a feasible flow in the network G$^{u*}$. The graph $$G_{f*}^{u*}$$

is the residual flow graph for flow f* in G$^{u*}$, and $C_{sd}$ denotes the set of 2-critical links for (s,d)∈P. The capacity of link $l_{ij}$ in network G is denoted $b_{ij}$. A 2-critical link for (s,d) is a link $l_{ij}$∈$C_{sd}$ if and only if i) $b_{ij}$≦u* and ii) there is no path between i and j in $$G_{f*}^{u*}.$$

Therefore, the determination of the set of 2-critical links for (s,d) constructs the residual flow graph $G_{f*}^{u*}$ and checks the above set of conditions for each link in the residual flow graph.

Once the set of 2-critical links are known, the link criticality indices are computed according to a weighting algorithm known in the art. In general, ingress-egress node pair (s,d) may have $\alpha_{sd}$ weight of and associated with it, and the criticality index of a link can be defined as the sum of the weights of the ingress-egress node pairs for which the link is 2-critical. Alternatively, the weights might be made inversely proportional to the maximum 2-route flow values (i.e., $\alpha_{sd}$=1/v*$_{sd}$ where v*$_{sd}$ is the maximum 2-route flow value for the ingress-egress pair (s,d)). This weighting implies that the 2-critical links for the ingress-egress pairs with lower maximum 2-route flow values will be weighted heavier than the ones for which the maximum 2-route flow value is higher.

Computing the disjoint path pair with the least total critically index of steps 205-207 of FIG. 2 are now described. Determination of the disjoint path pair may be formulated as a minimum cost (min-cost) network flow problem where each link has unit capacity, and the cost of the link is the link criticality index as computed above. A standard min-cost flow algorithm known in the art may be used to solve this min-cost network flow problem. For example, an algorithm to solve this min-weight (shortest) disjoint path problem is shown in FIG. 4.

Figure 4:
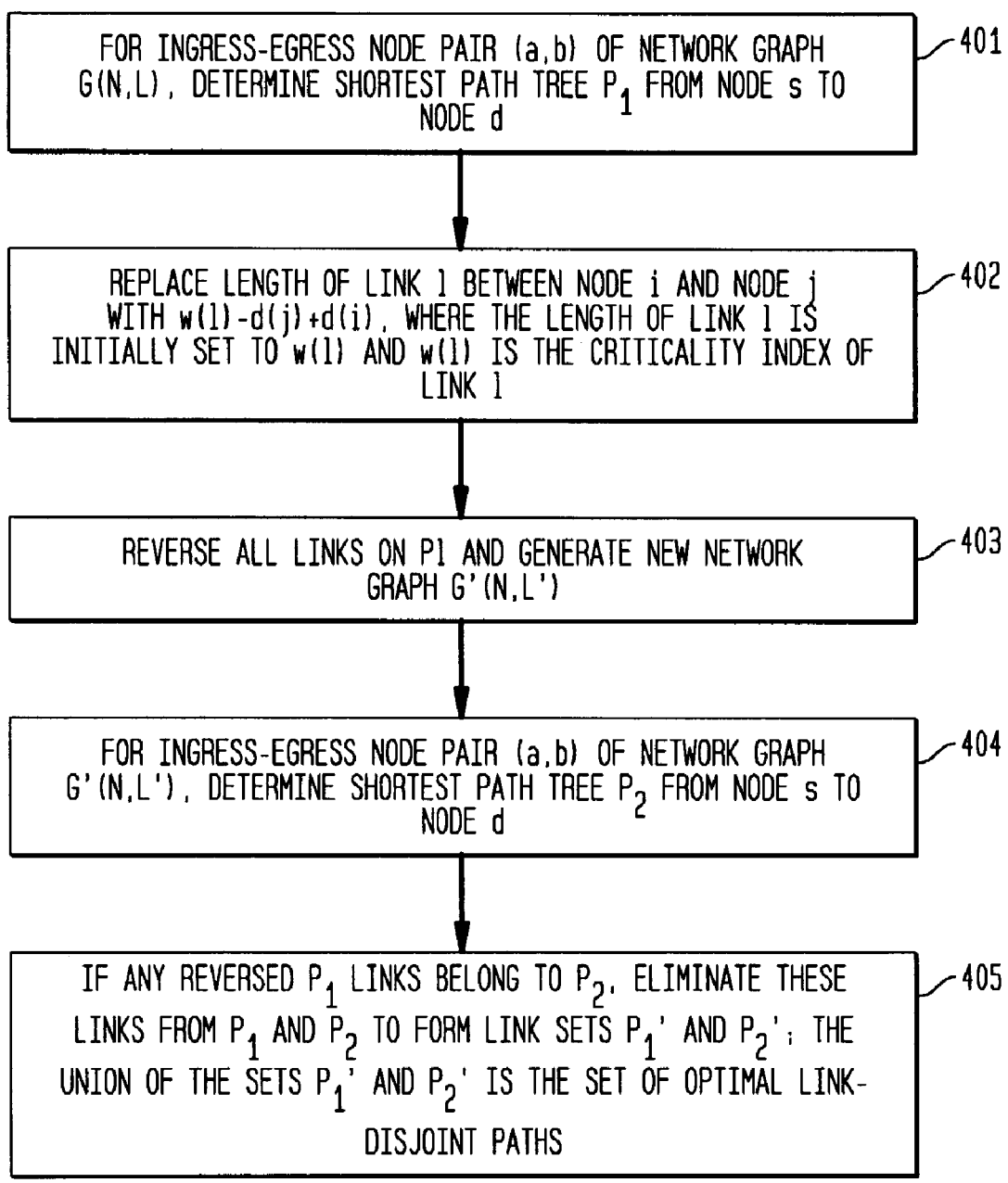
FIG. 4 shows an exemplary method of generating a optimal disjoint path pair as employed by the method of FIG. 2.

FIG. 4 shows an exemplary method of generating a optimal disjoint path pair for the ingress-egress node pair (a,b) as employed by steps 205-207 of FIG. 2 for the first exemplary embodiment. At step 401, the shortest path tree $P_1$ from node a to node b is calculated. Shortest path tree computation may employ, for example, the well-known Dijkstra's algorithm.

At step 402, the length of the link between nodes i and j is replaced by w(l)−d(j)+d(i), where d(k) represents the shortest path length from node s to node k. At step 403, all links on $P_1$ are reversed, and a new network graph G'(N,L') is generated, where L' denotes the set of links with $P_1$'s links reversed. At step 404, the shortest path tree $P_2$ is generated from node a to node d. At step 405, if any of the reversed links of $P_1$ belong to the path $P_2$, these links are eliminated from $P_1$ and $P_2$ to form sets $P_1$' and $P_2$'. The union of the sets $P_1$' and $P_2$' is the set of optimal link-disjoint paths.

In accordance with a second exemplary embodiment of the present invention, the disjoint routing algorithm is based on shortest path computation. A restorable routing algorithm in accordance with the second exemplary embodiment does not compute maxflow values, but solves the maximum 2-route flow problem as a sequence of shortest disjoint path problems. The second exemplary embodiment computes the maximum 2-route flows only approximately, and therefore, a set of 2-critical links determined from the approximate maximum 2-route flows is also an approximation.

The maximum 2-route flow is computed for ingress-egress node pair (s,d). A variable $x_j$ is associated with each disjoint path pair $j \in T_{sd}$ such that it represents the flow on j (i.e., the flow on each of the two disjoint paths of j). Therefore, the maximum 2-route flow problem (MAX-2-R P) may be formulated as the operation of equation (2):

$$\text{MAX-2-}R\,P: \quad \text{maximize} \sum_{j \in T_{sd}} x_j \qquad (2)$$

$$\text{subject to:} \quad \sum_{j: l \in j} x_j \leq b_l \quad \forall\, l \in L$$

The objective function of the problem MAX-2-R P is to calculate the total flow on the set of active paths (or the set of backup paths) between s and d, and the constraint for any link l is that the overall flow (active plus backup) on the link is less that the link's capacity. One solution of the problem MAX-2-R P employs an ε-approximation algorithms for the maximum 2-route flow problem.

For each link $l \in L$, associate a dual variable $\lambda_l$, which is the "dual length" of the link. Then the dual problem MAX-2-R D of the MAX-2-R P problem may be formulated as the operation of equation (3):

$$\text{MAX-2-}R\,D: \quad \text{minimize} \sum_{l \in L} \lambda_l b_l \qquad (3)$$

$$\text{subject to:} \quad \sum_{l \in j} \lambda_l \geq 1 \quad \forall\, j \in T_{sd}$$

A vector λ is defined as the vector of the dual lengths $\lambda_l$, and the "length" of a disjoint path pair j, represented $\text{length}_j(\lambda)$, is defined as the sum of the dual lengths of all links on j $$\text{(i.e., length}_j(\lambda) = \sum_{l \in j} \lambda_l\text{).}$$

The length of the "shortest" disjoint path pair is denoted $\alpha(\lambda)$ (i.e., $\alpha(\lambda) = \min_{j \in T_{sd}} \text{length}_j(\lambda)$). The constraint set in the problem D may be expressed as $\alpha(\lambda) \geq 1$, and the dual problem MAX-2-R D may be expressed as $$\min\{\sum_l \lambda_l b_l \mid \alpha(\lambda) \geq 1\}.$$

A ε-approximation algorithm may be employed to generate an approximate solution to the dual (e.g., to within approximately (1+2ε) of the optimal solution). A discussion of ε-approximation algorithms may be found in Garg and Konemann, "Faster and Simpler Algorithms for Multicommodity Flow and Other Fractional Packing Problems," which is incorporated herein in its entirety by reference.

Figure 5:
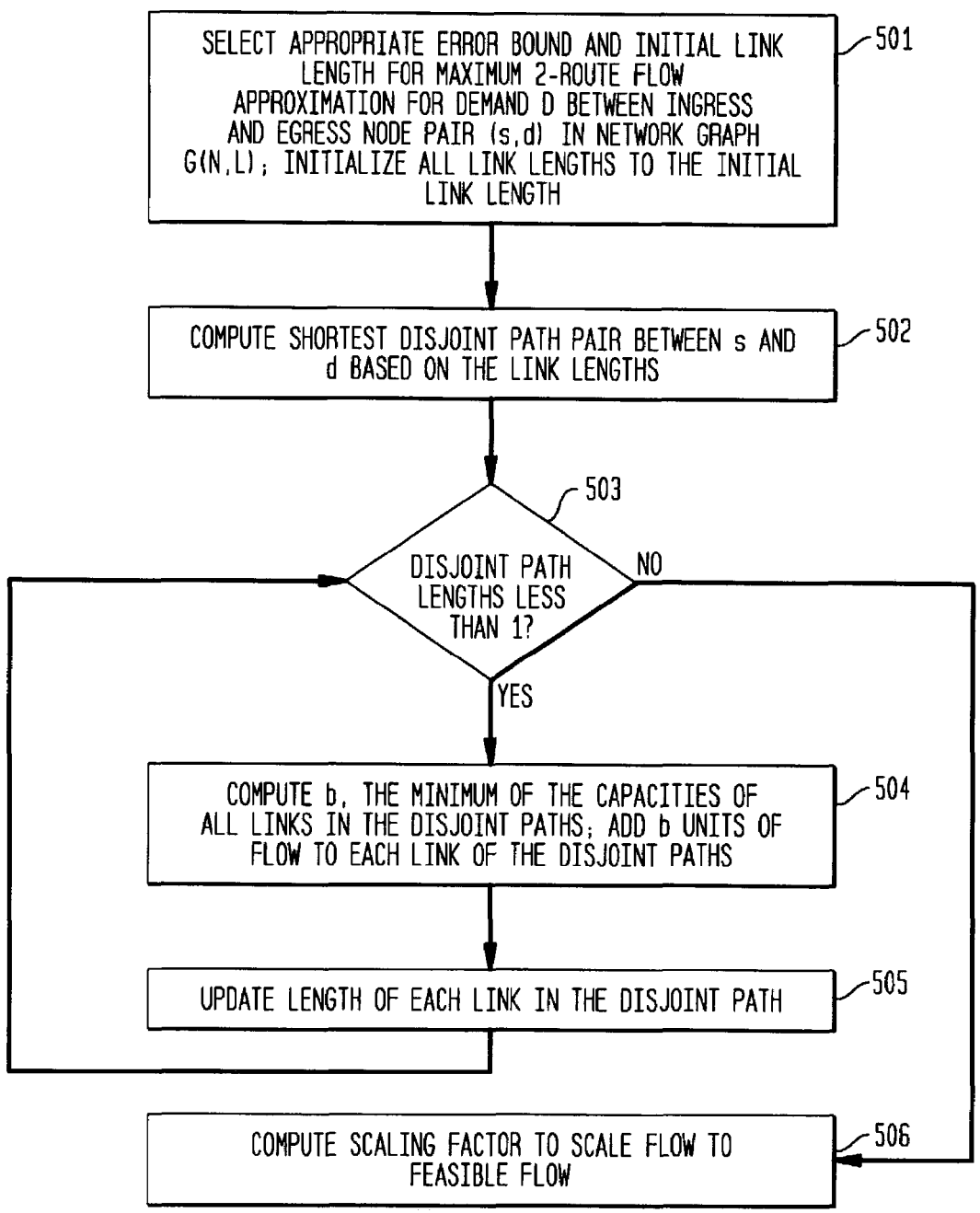
FIG. 5 shows an alternative method of maximum 2-route flow computation as employed by the method of FIG. 2.

The ε-approximation algorithm is a primal-dual approach, and proceeds in iterations. At any iteration, both the primal flow variables as well as the dual length variables are updated. FIG. 5 shows an alternative method of maximum 2-route flow computation as employed by step 202 of FIG. 2 that implements an ε-approximation algorithm. At step 501, the error bound variables and initial link lengths are initialized. The error bound variable ε is defined to be a small number, chosen appropriately depending on the desired level of accuracy, which may be related to $(1-\epsilon)^2$. The dual length of any link l at the beginning of the $i^{th}$ iteration is denoted $\lambda_l(i-1)$. The length of every link $\lambda_l(0)$ is initialized to δ, for some small constant δ (δ is selected on the basis of ε, as described subsequently). At step 502, the shortest disjoint path pair between s and d is computed based on the link lengths. Computation of the shortest disjoint path pair of step 502 may employ the method of FIG. 4.

Steps 503 through 505 implement an iterative process, outlined as follows. During the $i^{th}$ iterative step of the ε-approximation algorithm, flow on the disjoint path pair of length $\alpha(\lambda(i-1))$ is added (i.e., the flow is added on the shortest disjoint path pair). The amount of flow added is equal to the minimum of the capacities (the actual capacities, not the residual capacities) of all links on the shortest disjoint path pair. The variable b denotes this minimum capacity, and b units of flow is added on each of the two paths of the shortest disjoint path pair. The length $\lambda_l$ of any link l on the shortest disjoint path pair is updated as $\lambda_l \leftarrow \lambda_l(1+(\epsilon b/b_l))$ (the lengths of the rest of the links, where no flow are added, are left unchanged), and this length is the length of the link for the next shortest path iteration.

Therefore, the length of a link increases as more and more flow is routed on an link. Flow is always added on the shortest disjoint path pair; and the ε-approximation algorithm avoids adding flows on paths having heavier loading. The length $\alpha(\lambda(i))$ of the shortest disjoint path pair is strictly increasing with the iteration number i. The ε-approximation algorithm stops at the iteration in which this length becomes equal to or exceeds 1 for the first time, since, for a feasible primal-dual solution, this length is desirably no less than 1.

Returning to FIG. 5, the iterative process begins at step 503, where a test determines whether the disjoint path lengths are less than 1. If the test of step 503 determines that the disjoint path lengths are greater than or equal to one, the method advances to step 506 for scaling, described below. If the test of step 503 determines that the disjoint path lengths are less than one, the method advances to step 504. At step 504, the value of b, the minimum of the capacities of all links in the disjoint paths, is calculated, and b units of flow is added to each link of the disjoint paths. At step 505, the length of each link in the disjoint path is updated, and the method returns to step 503 to complete an iteration.

At step 506, a scaling factor is computed to scale the flows on the disjoint path pair. At every iteration, flows are added on paths without any consideration of the amount of flow that has been already routed on the links, or the link residual capacities. Therefore, on termination, an infeasible flow assignment may be generated. Therefore, the flows are "scaled" down at step 506 so that the flows correspond to feasible flows. The scaling of step 506 divides the flows on all links by the scaling factor η.

The values of δ for initialization of the link lengths and the scaling factor η may be selected as follows. The value for ε is a given, small value that may be determined off-line through simulation. The value of δ is computed as in equation (4):

$$\delta = (1+\epsilon)((1+\epsilon)2n)^{-1/\epsilon}, \quad (4)$$

where n is the number of nodes in the network, and the scaling factor η is set as in equation (5):

$$\eta = \log_{1+\epsilon}\frac{1+\epsilon}{\delta} = \frac{1}{\epsilon}(1 + \log_{1+\epsilon}2n). \quad (5)$$

The 2-route flow found by the method of FIG. 5 is at least $(1-\epsilon)^2$ times the maximum 2-route flow. In addition, for this value of δ, the running time of the algorithm is at most $$m\left[\frac{1}{\epsilon}\log_{1+\epsilon}2L\right]T_{sp},$$

where $T_{sp}$ is the time required to compute the shortest paths between two nodes in the graph's disjoint path pair. Since the approximation factor of the algorithm is $(1-\epsilon)^2$, a desired level of accuracy may be implemented by choosing a sufficiently small value of ε.

Figure 6:
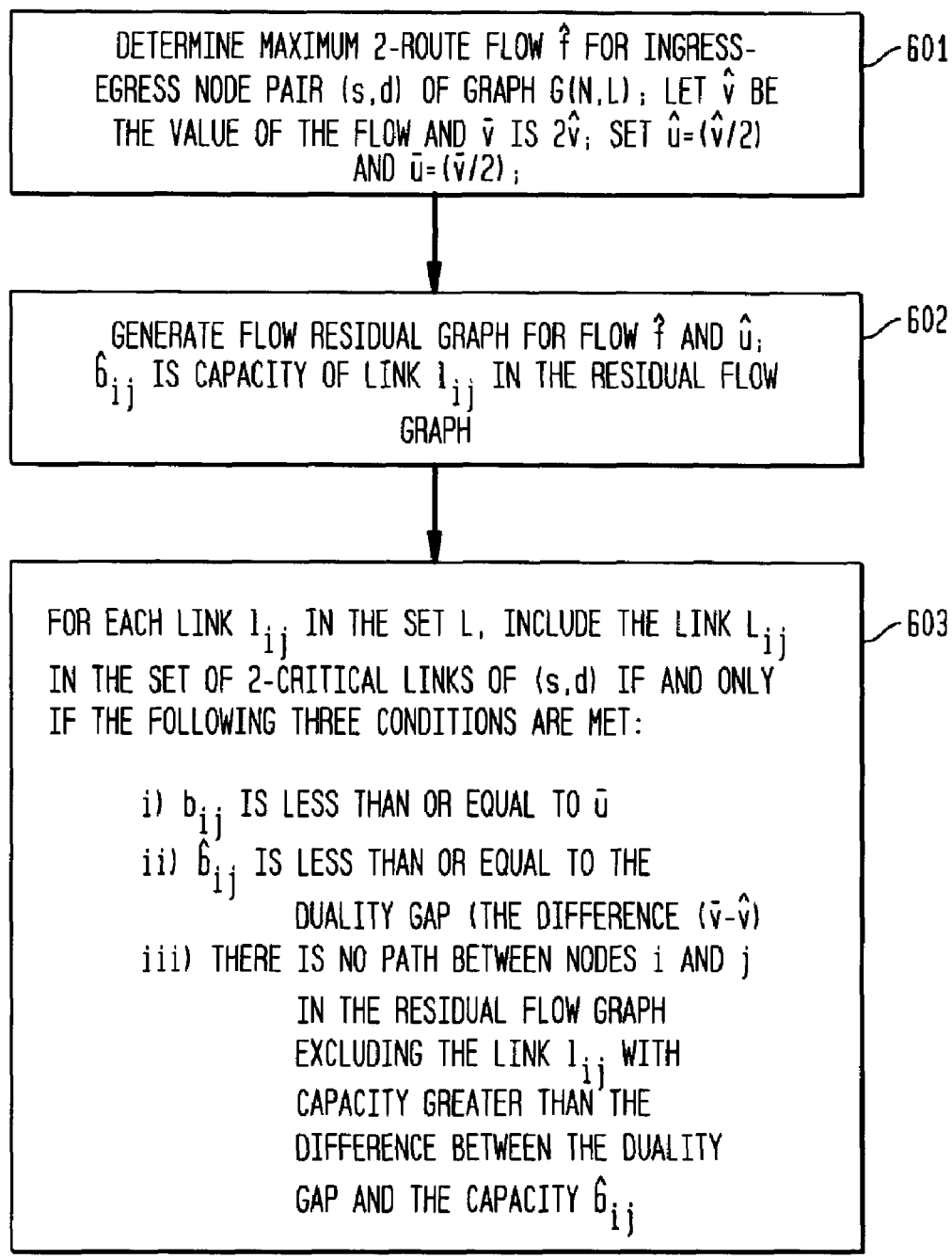
FIG. 6 shows a method of estimating 2-critical links as employed by the method of FIG. 2.

Once the approximate maximum 2-route flow between (s,d) is computed, the method of generating the set of 2-critical links for (s,d) might be implemented as described above with respect to the first exemplary embodiment. However, since the maximum 2-route flow computed by the method of FIG. 5 is an approximation, the resulting set of 2-critical links obtained by this procedure will also be approximate. Consequently, the second exemplary embodiment of the present invention may alternatively employ the method of FIG. 6 to generate an approximation to the set of 2-critical links.

At step 601, the maximum 2-route flow f̂ for the ingress-egress node pair (s,d) is determined employing the method of FIG. 5, and the value v̂ denotes the corresponding flow value. Since v̂ is the value of the total flow, including active and backup flows, the capacity bound û for a path is set as û=v̂/2. The method of FIG. 5 not only finds a feasible and close-to-optimal primal solution to the maximum 2-route flow, but also produces a feasible dual solution. On termination of the method of FIG. 5, the length of the shortest disjoint path pair is greater than 1, so the constraints of the dual problem MAX-2-R D are also satisfied. The variable $\hat{\lambda}_l$ denotes the dual length of any link l when the method of FIG. 5 terminates. The variable v̄ is two times the dual objective function's capacity bound value ū

$$(\text{i.e., } \bar{v} = 2\sum_{l\in L}\hat{\lambda}_l b_l = 2\bar{u}),$$

and so, by weak duality, v̂≦v*≦v̄, where v* is the maximum 2-route flow value. The difference Δv=v̄−v̂ is defined as the duality gap.

At step 602, the flow residual graph $$G\frac{\hat{u}}{\hat{f}}$$

is generated for the maximum 2-route flow f̂ with capacity bound û. The value $b_{ij}$ is defined as the capacity of link $l_{ij}$ in the flow residual graph $$G\frac{\hat{u}}{\hat{f}}.$$

At step 603, the method searches through each of the links in the flow residual graph $$G\frac{\hat{u}}{\hat{f}}.$$

A link $l_{ij}$ is included in the set of 2-critical links for (s,d) if and only if all of the following conditions hold: i) $b_{ij}$≦ū, ii) $b_{ij}$≦Δv, and iii) there is no path between nodes i and j in flow residual graph $$G\frac{\hat{u}}{\hat{f}}(N, L - l_{ij})$$

with capacity greater than $(\Delta v - b_{ij})$. The graph $$G\frac{\hat{u}}{\hat{f}}(N, L - l_{ij})$$

represents the graph constructed from $$G\frac{\hat{u}}{\hat{f}}$$

by removing the link $l_{ij}$.

FIG. 7 shows an exemplary processing section of a router 700 implementing one or more exemplary embodiments of restorable routing of the present invention. Router 700 includes a controller 701, QoS-preserving switch-fabric 702, input interface and scheduler 703, output interface and scheduler 704, and memory 705. QoS-preserving switch-fabric 702 allows routing of packets through router 700 with a known or fixed delay, thereby allowing the network to account for the delay to maintain QoS levels. The input interface and scheduler 703 and output interface and scheduler 704 each include queues and service scheduling to maintain QoS levels. Memory 705 includes a forwarding table 710 and may also include a set of policy rules 711 for network routing. Controller 701 causes QoS preserving switch-fabric 702 to route packet flows between input interface and scheduler 703 and output interface and scheduler 704 based on labels (for MPLS networks) or source and destination addresses (for IP networks) in accordance with the forwarding table 710. Forwarding table 710 may be constructed by controller 701 using information from a centralized network management system 720 that employs the restorable routing method shown in FIG. 2. Alternatively, forwarding table 710 may be constructed in accordance with the restorable routing method by the controller 701 from network topology information and a connection request contained in a control packet received at input interface 703.

A method of restorable routing with service level guarantees illustrated by the exemplary embodiments of FIGS. 2-7 may provide for the advantages of more efficient utilization of network service level capacity, reducing congestion of routers at network nodes, and higher packet throughput of the network.

As would be apparent to one skilled in the art, the various functions of method of routing restorable connections with service-level guarantees may be implemented with circuit elements or may also be implemented in the digital domain as processing steps in a software program. Such software may be employed in, for example, a digital signal processor, micro-controller or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of routing data of a connection request through a network of nodes interconnected by links and having one or more ingress-egress node pairs between which a stream of data or packets of the connection is routed as a flow over one or more paths, comprising the steps of:
   (a) generating a maximum 2-route flow for each of the ingress-egress node pairs in the network, wherein:
      (i) the maximum 2-route flow has the maximum total amount of flow that enters the destination node for that flow, including flow over both active and backup paths, that over the path between the two nodes of each pair, without exceeding capacities of links of the path;
      (ii) the maximum 2-route flow is expressed as a non-negative liner sum of elementary 2-flows, each elementary 2-flow having one demand unit along a pair of link-disjoint paths;
   (b) generating a set of 2-critical links with associated criticality indices for each of the ingress-egress node pairs based on the corresponding maximum 2-route flow;
   (c) modifying a graph of the network by the steps of
      (c1) eliminating any links in the graph having residual capacity less than a demand of the connection request, and
      (c2) weighting each link in the modified graph based on the criticality indices of the links;
   (d) determining a disjoint path pair through the modified graph between an ingress node and an egress node of the connection request;
   (e) selecting one of the disjoint path pair as an active path and the other one of the disjoint path pair as a backup path; and
   (f) routing the data over the active path.

2. The method as recited in claim 1, wherein step (a) comprises, for each ingress-egress node pair, the steps of:
   (a1) generating a first maxflow value for the ingress-egress node pair of the graph;
   (a2) generating a capacity-bounded graph from the graph based on the first maxflow value;
   (a3) generating a second maxflow value for the ingress-egress node pair of the capacity-bounded graph;
   when the second maxflow value is equal to the first maxflow value:
      (a4) setting, the maximum 2-route flow to the first maxflow value, and when the second maxflow value is less than the first maxflow value:
      (a5) forming a new capacity-bounded graph based on the first and second maxflow values;
      (a6) generating a third maxflow value for the new capacity-bounded graph; and
      (a7) setting the maximum 2-route flow to the third maxflow value.

3. The method as recited in claim 1, wherein step (a) comprises the step of solving a primal-dual approximation to a liner programming problem characterizing 2-route flows between an ingress-egress node pair.

4. The method as recited in claim 3, wherein the step of solving the primal-dual approximation comprises the steps of:
   (a1) selecting an initial error bound and an initial link length;
   (a2) initializing all link lengths to the initial link length;
   (a3) computing a shortest disjoint path pair having corresponding disjoint path lengths between the ingress-egress node pair;
   when the lengths of the disjoint path pair are less than one:
      (a4) computing a minimum value flow of all link capacities in the disjoint path pair,
      (a5) adding the minimum value flow to each link of the disjoint path pair,
      (a6) updating the lengths of the disjoint path pair, and
      (a7) repeating steps (a4)-(a7) until the lengths of the disjoint path pair are not less than one; and
   when the lengths of the disjoint path pair are not less than one:
      (a8) computing a scaling factor; and
      (a9) scaling flows over the disjoint path pair based on the scaling factor.

5. The method as recited in claim 1, wherein step (b) comprises the steps of:
   (b1) constructing a residual flow graph from the graph for each ingress-egress node pair;
   (b2) including a link of the residual flow graph in the set of 2-critical links if, and only if:
      i) the capacity of the link between two nodes is less than or equal to half the maxflow value of the graph, and
      ii) there is no path in the residual flow graph between the two nodes.

6. The method as recited in claim 1, wherein step (b) comprises, for each ingress-egress node pair, the steps of:

(b1) determining the maximum 2-route flow for the ingress-egress node pair and a corresponding capacity bound for the graph;

(b2) generating a residual flow graph for the maximum 2-route flow and the corresponding capacity bound;

(b3) testing, for each link, whether a set of conditions are met by the link; and (b4) including, if the set of conditions are met by the link, the link in the set of 2-critical links for the ingress-egress node pair.

7. The method as recited in claim 1, wherein step (d) comprises the steps of:

(d1) determining a first shortest path tree for the graph of the network between the ingress node and egress node of the connection request;

(d2) updating a length of each link in the graph based on the criticality indices;

(d3) reversing the links in the graph corresponding to links of the first shortest path tree to generate a new network graph;

(d4) determining a second shortest path tree for the new network graph between the ingress node and egress node of the connection request; and (d5) generating the disjoint path pair from the first and second shortest path trees.

8. The method as recited in claim 7, wherein step (d5) comprises the steps of i) eliminating from the first and second shortest path trees the reversed links of the first shortest path tree that coffespond to links of the second shortest path tree; and ii) combining the remaining links of the first and second shortest path trees to form the disjoint path pair.

9. The method as recited in claim 1, wherein the request of step (a) is a network tunnel request of either an asynchronous mode (ATM) network, an internet protocol (IP) network, a multi-protocol label switched path (MPLS) network, or an optical network.

10. The method of claim 1, wherein each of the 2-critical links for an ingress-egress node pair has a value that decreases whenever capacity of the link is decreased.

11. Apparatus for routing data of a connection request through a network of nodes interconnected by links and having one or more ingress-egress node pairs between which a stream of data or packets of the connection is routed as a flow over one or more paths, the apparatus comprising:

an input module for receiving 1) a request for a path with a service demand for routing data between one of the ingress-egress pairs of the network; and 2) the data associated with the request;

a processing module for determining the path of the request, wherein the processing module determines the path by:

(1) generating a maximum 2-route flow for each of the ingress-egress node pairs in the network, wherein:

(i) the maximum 2-route flow has the maximum total amount of flow that enters the destination node for that flow, including flow over both active and backup paths, that over the path between the two nodes of each pair, without exceeding capacities of links of the path;

(ii) the maximum 2-route flow is expressed as a non-negative linear sum of elementary 2-flows, each elementary 2-flow having one demand unit along a pair of link-disjoint paths;

(2) generating a set of 2-critical links with associated criticality indices for each of the ingress-egress node pairs based on the corresponding maximum 2-route flow;

(3) modifying a graph of the network by the steps of (i) eliminating any links in the graph having residual capacity less than a demand of the connection request, and (ii) weighting each link in the modified graph based on the criticality indices of the links; and (4) determining a disjoint path pair through the modified graph between an ingress node and an egress node of the connection request; and a switch-fabric for transfeffing data from the input module to an output module of a router in accordance with the path of the request.

12. The apparatus of claim 11, wherein each of the 2-critical links for an ingress-egress node pair has a value that decreases whenever capacity of the link is decreased.

13. A computer-readable medium having stored thereon a plurality of instructions which, when executed by a processor, cause the processor to implement a method for routing data of a connection request through a network of nodes interconnected by links and having one or more ingress-egress node pairs between which a stream of data or packets of the connection is routed as a flow over one or more paths, the method comprising the steps of:

(a) generating a maximum 2-route flow for each of the ingress-egress node pairs in the network, wherein:

(i) the maximum 2-route flow has the maximum total amount of flow that enters the destination node for that flow, including flow over both active and backup paths, that over the path between the two nodes of each pair, without exceeding capacities of links of the path;

(ii) the maximum 2-route flow is expressed as a non-negative liner sum of elementary 2-flows, each elementary 2-flow having one demand unit along a pair of link-disjoint paths;

(b) generating a set of 2-critical links with associated criticality indices for each of the ingress-egress node pairs based on the corresponding maximum 2-route flow;

(c) modifying a graph of the network by the steps of (c1) eliminating any links in the graph having residual capacity less than a demand of the connection request, and (c2) weighting each link in the modified graph based on the criticality indices of the links;

(d) determining a disjoint path pair through the modified graph between an ingress node and an egress node of the connection request;

(e) selecting one of the disjoint path pair as an active path and the other one of the disjoint path pair as a backup path; and (f) routing the data over the active path.

14. The hwenhen computer-readable medium of claim 13, wherein each of the 2-critical links for an ingress-egress node pair has a value that decreases whenever capacity of the link is decreased.

* * * * *

UNITED STATES PATENT AND TRADEMARK OFFICE
CERTIFICATE OF CORRECTION

| | |
|---|---|
| PATENT NO. | : 7,397,761 B2 |
| APPLICATION NO. | : 10/357558 |
| DATED | : July 8, 2008 |
| INVENTOR(S) | : Koushik Kar, Muralidharan S. Kodialam and Tirunell V. Lakshman |

It is certified that error appears in the above-identified patent and that said Letters Patent is hereby corrected as shown below:

In Column 15, on lines 30-31, replace "coffespond" with --correspond--.

In Column 16, on line 17, replace "transfeffing" with --transferring--.

In Column 16, on line 59, delete "hwenhen".

Signed and Sealed this

Seventh Day of April, 2009

JOHN DOLL
*Acting Director of the United States Patent and Trademark Office*